(12) United States Patent
Laible

(10) Patent No.: US 12,441,548 B2
(45) Date of Patent: Oct. 14, 2025

(54) STACKING COLUMN FOR STORING ELECTRIC VEHICLE BATTERIES

(71) Applicant: MTS Maschinenbau GmbH, Mengen (DE)

(72) Inventor: Eckhard Laible, Leinfelden-Schlechtenmühle (DE)

(73) Assignee: MTS Maschinenbau GmbH, Mengen (DE)

( * ) Notice: Subject to any disclaimer, the term of this patent is extended or adjusted under 35 U.S.C. 154(b) by 0 days.

(21) Appl. No.: 18/581,917

(22) Filed: Feb. 20, 2024

(65) Prior Publication Data

US 2024/0278994 A1    Aug. 22, 2024

(30) Foreign Application Priority Data

Feb. 22, 2023 (DE) .................. 10 2023 104 336.6
Feb. 15, 2024 (DE) .................. 10 2024 104 302.4

(51) Int. Cl.
*B65G 1/14* (2006.01)
*H01M 50/204* (2021.01)

(52) U.S. Cl.
CPC ............ *B65G 1/14* (2013.01); *H01M 50/204* (2021.01); *H01M 2220/20* (2013.01)

(58) Field of Classification Search
CPC .......... B65G 1/14; B65G 57/00; B65G 57/03; B65G 90/0073; B65G 1/02;
(Continued)

(56) References Cited

U.S. PATENT DOCUMENTS 4,712,691 A * 12/1987 Grill .................... B65G 1/14
                                                      211/49.1
5,938,051 A *  8/1999 Scholler .............. B65G 1/14
                                                      211/59.4
(Continued)

FOREIGN PATENT DOCUMENTS

DE    2930053 A1   2/1981
DE    9318410 U1   2/1994
DE   29808971 U1   9/1998

OTHER PUBLICATIONS

German office action dated Dec. 15, 2023, issued in corresponding application DE 10 2023 104 336.6.

*Primary Examiner* — Devin K Barnett
(74) *Attorney, Agent, or Firm* — Bachman & LaPointe, P.C.

(57) ABSTRACT

The invention relates to a stacking column for storing electric vehicle batteries one above the other or next to one another on or on pawls (7.1-7.3), wherein the pawls (7.1-7.3) are accommodated in a U-body and the U-body has two side walls (1.1, 1.2), a rear wall (2) and an opening edge, wherein the pawls (7.1-7.3) rotate about axes (8.1-8.3) from a resting position into a working position between the two side walls (1.1, 1.2) and have a support part (9) on one side of the axis (8.1-8.3) and a rear part (10) on the other side of the axis (8.1-8.3), wherein the pawl (7.1-7.3) is supported in the working position with the rear part (10) against a polygonal bolt stop (13), wherein the polygonal bolt stop (13) is arranged between the two side walls (1.1, 1.2) with on the rear wall (2) and the supporting part (9) rests on a polygonal bolt support (12), wherein the polygonal bolt support (12) rests between the two side walls (1.1, 1.2) at the opening edge ( ), suitable for supporting the support part (9) of the pawls (7.1-7.3) in the working position in a bottom side by the polygonal bolt support (12), the polygonal bolt stop (13)
(Continued)

simultaneously bearing in a supporting manner in an upper side of the rear part (10) of the pawls (7.1-7.3).

9 Claims, 3 Drawing Sheets

(58) Field of Classification Search
CPC ............ H01M 50/204; H01M 2220/20; A47F 7/0014; A47F 7/0042; A47F 2005/165; A47F 5/16; A47F 5/12; A47B 57/045
See application file for complete search history.

(56) References Cited

U.S. PATENT DOCUMENTS

| | | | | |
|---|---|---|---|---|
| 5,988,777 A * | 11/1999 | Schoeller | ................ | B65G 1/14 |
| | | | | 312/190 |
| 6,223,911 B1 * | 5/2001 | Weaver | ................... | B65G 1/14 |
| | | | | 211/150 |
| 7,350,649 B1 * | 4/2008 | Martens | ................. | A47F 7/144 |
| | | | | 211/187 |
| 9,022,371 B2 * | 5/2015 | Seghezzi | ................ | B65G 1/14 |
| | | | | 248/304 |
| 10,829,318 B2 * | 11/2020 | Kreft | ..................... | A47F 7/0014 |
| 2005/0035691 A1 * | 2/2005 | Strobel | .................... | B65G 1/14 |
| | | | | 312/42 |
| 2006/0226102 A1 * | 10/2006 | Strobel | .................... | B65G 1/14 |
| | | | | 211/150 |
| 2007/0152544 A1 * | 7/2007 | Strobel | .................... | B65G 1/14 |
| | | | | 312/9.58 |
| 2007/0160453 A1 * | 7/2007 | Jimenez | ................. | B65G 1/14 |
| | | | | 410/43 |
| 2019/0077602 A1 * | 3/2019 | Giachero | ............... | B65G 1/14 |
| 2021/0061570 A1 * | 3/2021 | Laible | ...................... | B65G 1/14 |
| 2023/0050064 A1 * | 2/2023 | Laible | ...................... | B62B 3/10 |
| 2023/0246277 A1 * | 8/2023 | Laible | ................ | H01M 50/204 |
| | | | | 429/100 |
| 2024/0033896 A1 * | 2/2024 | Laible | ...................... | H01F 7/02 |
| 2024/0277162 A1 * | 8/2024 | Laible | ................. | A47F 7/0007 |

* cited by examiner

STACKING COLUMN FOR STORING ELECTRIC VEHICLE BATTERIES

CROSS-REFERENCE TO RELATED APPLICATIONS

This application claims priority to German Patent Application Numbers DE 10 2023 104 336.6 filed Feb. 22, 2023 and DE 10 2024 104 302.4 filed Feb. 15, 2024, which are incorporated herein by reference in their entireties.

TECHNICAL AREA

The invention relates to a stacking column for storing electric vehicle batteries according to the general term of claim 1.

STATE OF THE ART

Such stacking columns are used in the automotive industry in particular to temporarily store sheet metal parts that come from a molding line and need to be transported for further processing.

In this context, reference is made to DE 93 18 410 U1. This discloses a stacking column in which the ratchet levers are provided with spring means which transfer them unloaded from their supporting position to their catching or resting position, whereby stop pins extending transversely in the tower body are provided as a rotational stop for the holding arms of the ratchet levers in the arresting position, and that the ratchet levers are identical to one another and that the supporting arm and the holding arm are of the same width and aligned with one another. The disadvantage of the stop pins, however, is that the circular profile of the stop pins has repeatedly broken, bent or led to the bending of the ratchet levers in practice under high weights and the acceleration forces that occur during transportation.

DE 29 30 053 A1 also shows a similar design. Circular bearing bolts are also used there, which are actually only pushed into the corresponding side walls as required in order to provide support, also only in the rear area of the pawl. Here too, high weights lead to the disadvantages described above.

Reference is also made to DE 298 08 971 U1, which provides for a shock-absorbing and elastic material made of plastic or rubber on the pawl levers themselves in order to be able to absorb the resulting forces. This is not feasible for heavy loads of several hundred kilos to several tons in weight, as the amount of shock-absorbing material made of plastic or rubber would be far too large to actually secure such a heavy load for transport, for example.

There are vertical stacking columns as well as horizontal or inclined ones, which are also to be subject to the present invention.

For loading such stacking columns, pawls that are connected to each other in such a way that they are moved from a resting position to a working position when the stacking column or a rack is filled with these stacking columns have proven to be very practical. This usually begins by placing a workpiece on the lowest pawl, which turns the lowest pawl into the working position. This rotation causes the bottom pawl to move the next pawl into a ready position in which it can pick up the next item to be stored. By picking up the next item to be stored, the next pawl is turned to the ready position. Outside the ready position and the working position, the pawls are in the resting position between, for example, two side walls of the stacking column.

A stacking column of this type is described in DE 20 2020 104 669 U1, for example.

Task of the Invention

The task of the present invention is to create a stacking column which is particularly suitable for holding and storing very heavy loads, in particular for storing electric vehicle batteries.

Solution to the Task

The solution to the problem is provided by the characterizing part of claim 1.

This has the advantage that the pawl is virtually braced between the stop and the support, which significantly relieves the axle around which the pawl rotates. The axle now only serves as a rocker, which transfers the weight of the vehicle electric battery on the support part to the stop via the rear part of the pawl. The effect described here is described in the context of the invention in such a way that the axle is essentially or completely weight-free.

This reduction in the load on the axle significantly reduces wear on the entire stacking column. This stacking column is easily capable of carrying loads weighing 650-1200 kilograms per vehicle electric battery. Up to five vehicle electric batteries, each weighing over 1000 kilos, can be carried in an arrangement of four to eight stacking columns and secured for transportation.

The stacking column is used to store electric vehicle batteries one above the other or next to one another on or on pawls, the pawls being accommodated in a U-body and the U-body having two side walls, a rear wall and an opening edge, the pawls rotating about axes from a resting position to a working position between the two side walls and having a support part on one side of the axis and a rear part on the other side of the axis.

The opening edge describes the edge of the side panels, which is the end of the side panels away from the rear wall.

The requirements for securing vehicle electric batteries are very high and cannot be compared with the components previously used in the automotive manufacturing process. Such a vehicle electric battery regularly weighs between 650 kg and 1200 kg each. When four large automotive electric batteries are stacked with the associated acceleration forces, the stacking columns and the pawls are often subjected to more than 6 tons. Despite all the developments in the field of automotive electric batteries, these are very sensitive components which, if stored or secured improperly, can not only cause damage to the component itself, but also to other legal assets due to the risk of fire and explosion.

For this purpose, the rear part of the pawl is supported against a stop in the form of a polygonal bolt stop or round bolt stop, whereby the polygonal bolt stop or the round bolt stop is arranged between the two side walls on the rear wall and, in addition, in the working position, the supporting part of the pawl rests on a support in the form of a polygonal bolt support or a round bolt support, whereby the polygonal bolt support or the round bolt support is arranged between the two side walls on the opening edge. For this purpose, the stop and the support are usually welded or joined between the two side walls. In addition, the explanations on the polygonal bolt support and the polygonal bolt stop also apply to the variant as a round bolt support and round bolt stop.

As a result, the design is suitable for supporting the support part of the pawls in the working position on a bottom side by means of the polygonal bolt support, while at the same time the polygonal bolt stop rests in a supporting manner in an upper side of the rear part of the pawls.

In this way, forces can be optimally transferred from the pawl to the polygonal bolt support and the polygonal bolt stop and dissipated via the U-profile. For this purpose, the U-profile can be reinforced in virtually any material thickness and designed as a double T-beam.

The U-body, the pawls and their axle, as well as the polygonal bolt stop and the polygonal bolt support are made of a metal material with a corresponding alloy.

The polygonal bolt support and/or the polygonal bolt stop each have a single contact surface, suitable for supporting the pawls in the working position. The contact surface can be adapted to the structure of the bottom side of the support part in such a way that the largest possible surface area of the support part and the contact surface is made possible.

The contact surface can also be smooth or ribbed. Ribbing can, for example, lead to additional stiffening of the polygonal bolt support and/or the polygonal bolt stop.

The polygonal bolt stop and/or the polygonal bolt support can be designed as a square bolt profile or triangular bolt profile. Other polygonal bolt profiles are also possible. In this context, it is important that the contact surface is as large as possible in order to enable a corresponding force absorption Preferably, the polygonal bolt stop and polygonal bolt support are also arranged between the two side walls in the same way as the axle and the pawl. Of course, it would also be possible for the polygonal bolt stop and polygonal bolt support to be inserted through the side walls from the outside, but then additional effort would have to be made to ensure that the polygonal bolt stop and polygonal bolt support are suitably fixed.

How the polygonal bolt stop and polygonal bolt support are fixed in or on the side walls is of secondary importance. However, it is preferable that the polygonal bolt stop and polygonal bolt support are embedded in the side walls so that no additional fasteners are required. It is sufficient to cut or notch the side walls slightly from each side. This also considerably simplifies the manufacturing process. For this reason, it is also envisaged that the polygonal bolt stop and/or polygonal bolt support are designed as a square so that they can simply be pushed into the notches.

It is important and particularly preferred that the polygonal bolt stop and polygonal bolt support are arranged in planes to each other, the distance between which corresponds to the thickness of the pawl. This determines the play and the spatial position of the pawl.

As heavy goods are involved, it is preferable for a buffer to be placed on the front of the support part. This buffer can be exchanged depending on the requirements of the vehicle electric battery and replaced by a buffer that is suitable for the respective vehicle electric battery in terms of material and spatial design.

The turning of the pawl from a working position to a ready position and to a resting position or vice versa is well known from the state of the art. Reference is made in particular to the literature cited in the prior art.

The pawls are preferably returned to their respective starting position by a simple force accumulator, for example by a coil spring, which is connected to the pawl on the one hand and to the side panel on the other.

In the present case, it is also intended to form at least one larger recess in the rear wall so that the stacking column can be handled by a crane, for example. This recess or other recesses can be used to check with a sensor, for example with a laser, whether the corresponding pawl is loaded.

FIGURE DESCRIPTION

Further advantages, features and details of the invention can be seen from the following description of preferred embodiments and from the drawings, which show in:

DETAILED DESCRIPTION OF THE INVENTION

Design Example

Figure 1:
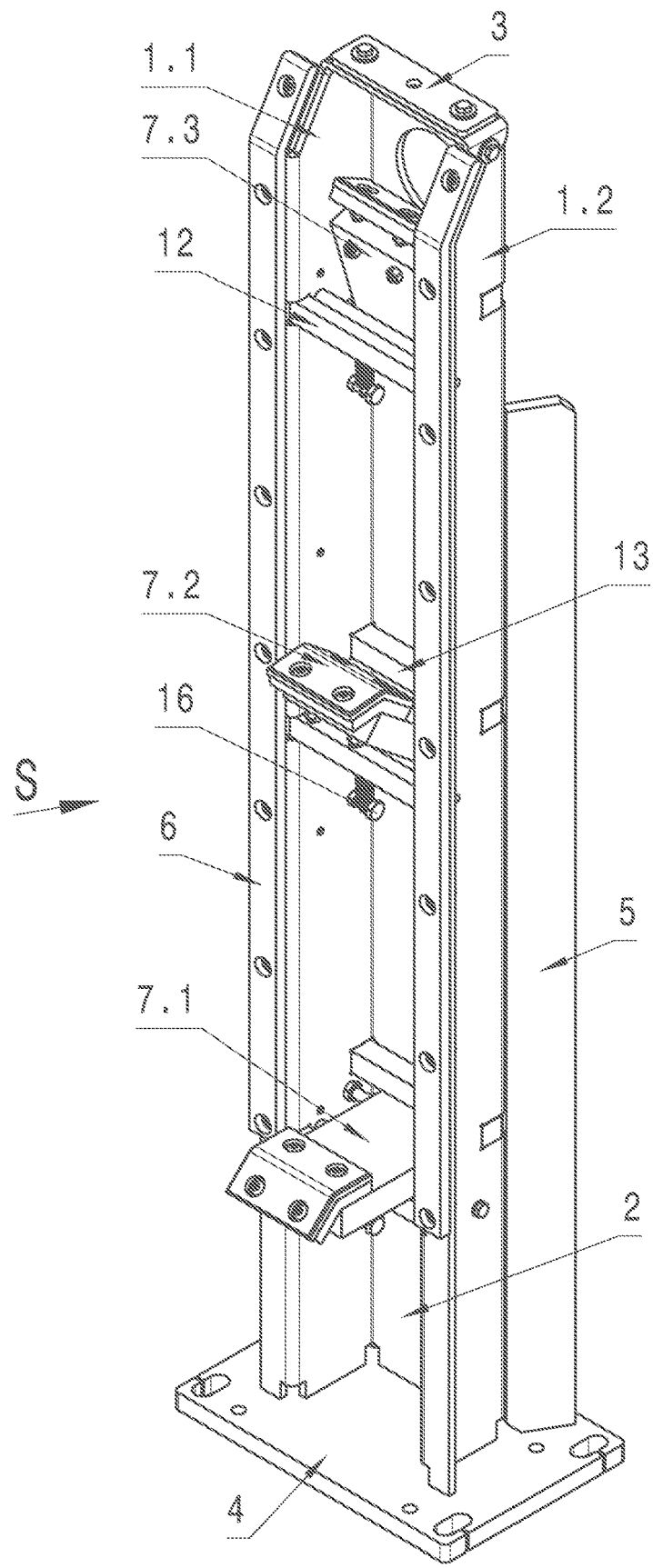
FIG. 1 is a perspective view of a stacking column according to the invention.
Figure 2:
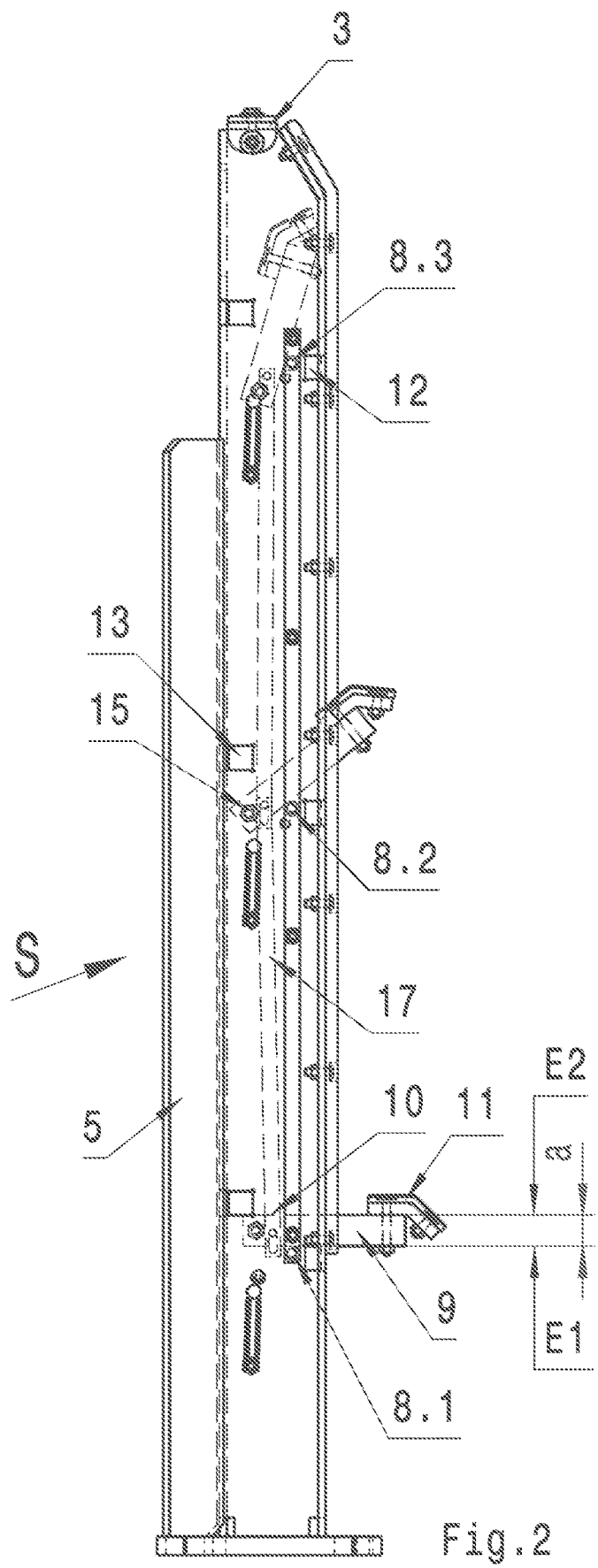
FIG. 2 is a side view of the stacking column as shown in FIG. 1.
Figure 3:
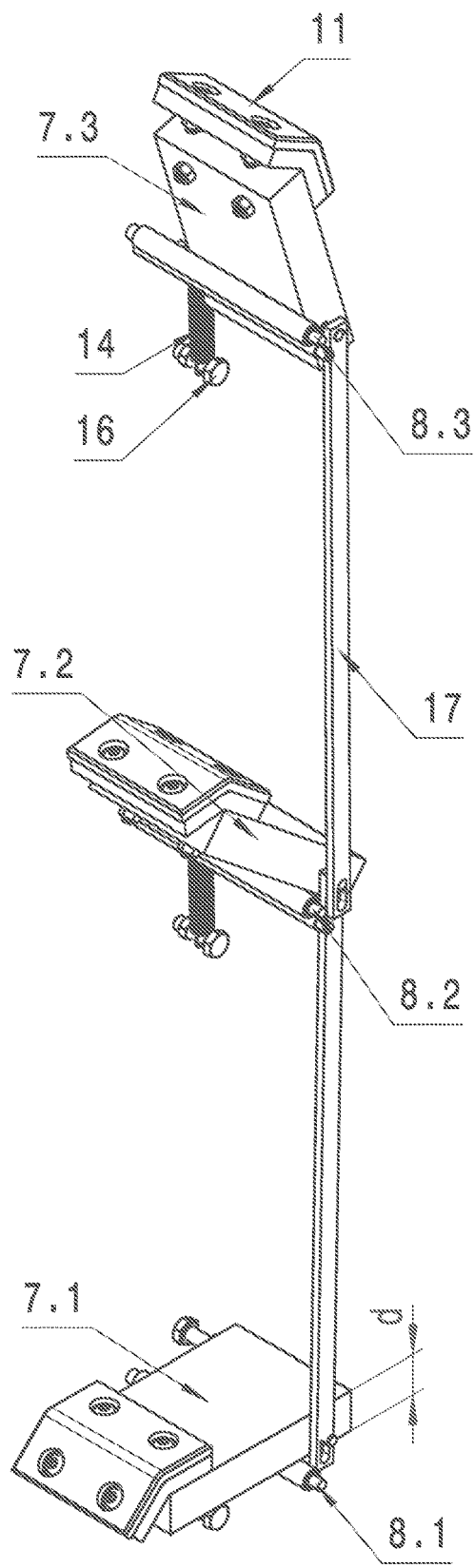
FIG. 3 is a perspective view of a linkage with pawls in the stacking column as shown in FIG. 1.

A stacking column S as shown in FIGS. 1 and 2 has two side walls 1.1 and 1.2, which are connected via a rear wall 2 to form a U-shaped profile. A desired distance between the two side panels 1.1 and 1.2 is also ensured by an upper crosspiece 3 and a lower base plate 4. A protective strip 5 is attached to the rear wall 2. Furthermore, a sliding strip 6 is assigned to the side panel 1.1.

Three pawls 7.1, 7.2 and 7.3 are located between the two side walls 1.1 and 1.2 as a support for electric vehicle batteries not shown in detail. Each pawl 1.1 to 1.3 rotates about an axis 8.1 to 8.3 from a resting position to a standby position or to a working position. Pawl 7.3 is in the resting position, pawl 7.2 is in the ready position and pawl 7.1 is in the working position. The pawls 7.1 to 7.3 are connected to each other via a linkage 17, which, by means of the individual connecting parts and corresponding elongated holes, ensures that when the pawl 7.1 is initially loaded, it moves from a ready position to a working position, thereby taking the middle pawl 7.2 with it via the linkage 17 and moving the pawl 7.2 to the ready position. When the pawl 7.2 is loaded with a load, this pawl takes the upper pawl 7.3 with it as it rotates about its axis 8.2, so that this pawl moves to the ready position. The corresponding movements and designs of the linkage are described in particular in DE 20 2020 104 669 U1.

The pawls 1.1 to 1.3 themselves are divided on one side of the axles 8.1 to 8.3 into a support part 9 and on the other side a rear part 10. A buffer 11, which serves to further support the vehicle's electric battery, is placed on the front of the support part 9. Preferably, this buffer 11 can be replaced depending on the vehicle electric battery.

Under each pawl 7.1 to 7.3 or its support part 9 there is a polygonal bolt support 12 on which the support part 9 rests in the working position so that it is adequately supported. For this purpose, this polygonal bolt support 12 is preferably embedded laterally in the side walls 1.1 or 1.2, although it can of course also be supported in a different way.

The rear part 10, on the other hand, is assigned a rear polygonal bolt stop 13, which is preferably also embedded in the side walls 1.1 or 1.2 and is located close to or on the rear wall 2.

The return of the individual pawls 7.1 to 7.3 to their respective starting positions is supported by force accumulators 14 in the form of coil springs 14, which are hooked into a bolt 15 on the rear part 10 on the one hand and into a fastening 16 on the side wall 1.1 or 1.2 on the other.

The respective axle 8.1 to 8.3 is arranged in relation to the polygonal bolt support 12 and the polygonal bolt stop 13 on the pawl 7.1 to 7.3 in such a way that the respective axle is not exposed to any dangerous forces from the electric battery. This in turn defines the fact that the pawl 7.1 to 7.3 is essentially weight-free.

The operation of the present invention is as follows:

As a rule, a number of stacking columns are set up in a triangle or rectangle, forming a receiving space for a load, in this case in particular a heavy load. The pawls 7.1 to 7.3 engage in the clear width of this receiving space in order to hold the load between the stacking columns.

In the starting position, the lower pawls 7.1 are in the ready position shown for the pawls 7.2, while the other pawls are in the resting position between the respective side walls 1.1 or 1.2. If the load is now inserted between the stacking columns, the pawl 7.1 takes it from the ready position to the working position. The pawl 7.1 takes the next pawl 7.2 in the ready position with it via the linkage 17. If this next pawl 7.2 is loaded, it takes the following pawl 7.3 from the resting position to the ready position via the linkage 17.

According to the present invention, however, the pawls 7.1 to 7.3 are securely supported in the working position, namely by the polygonal bolt support 12 and the polygonal bolt stop 13. For this purpose, the polygonal bolt support 12 and the polygonal bolt stop 13 are arranged at such a distance a between their two planes E1 and E2 that the pawl 7.1 to 7.3 is braced between polygonal bolt support 12 and polygonal bolt stop 13. Preferably, the distance a corresponds to a thickness d of the pawl 7.1 to 7.3.

The main advantage of the present invention is that the weight of the vehicle electric batteries no longer rests on the axles 8.1 to 8.3, but is distributed over the polygonal bolt support 12 and the polygonal bolt stop 13. This weight distribution makes it possible to place very heavy vehicle electric batteries without affecting the axles 8.1 to 8.3 of the pawls 7.1-7.3.

LIST OF REFERENCE SYMBOLS

| | |
|---|---|
| 1 | Side panel |
| 2 | Back wall |
| 3 | Traverse |
| 4 | Foot plate |
| 5 | Protective strip |
| 6 | Sliding strip |
| 7 | Pawl |
| 8 | Axis |
| 9 | Supporting part |
| 10 | Back part |
| 11 | Buffer |
| 12 | Polygonal bolt support |
| 13 | Polygonal bolt stop |
| 14 | Power accumulator |
| 15 | Bolt |
| 16 | Fastening |
| 17 | Linkage |
| a | Distance |
| d | Thickness |
| E | Level |
| S | Stacking column |

I claim:

1. A stacking column for storing electric vehicle batteries one above the other or next to one another on or on pawls (7.1-7.3), the pawls (7.1-7.3) are in a U-body and the U-body has two side walls (1.1, 1.2), a rear wall (2) and an opening edge; wherein each pawl (7.1-7.3) is configured to rotate about a respective axis of a plurality of axes (8.1-8.3) from a resting position into a working position between the two side walls (1.1, 1.2), and each pawl has a supporting part (9) on one side of the respective axis (8.1-8.3) and a rear part (10) on another side of the axis (8.1-8.3), wherein, when each pawl (7.1-7.3) is in the working position, each pawl is supported with the rear part (10) against a respective stop, the respective stop is arranged between the two side walls (1.1, 1.2) and the supporting part (9) is configured to rest on a respective polygonal support of a plurality of polygonal supports, each polygonal support is arranged between the two side walls (1.1, 1.2) at the opening edge, wherein the supports are configured to support the supporting part (9) of the pawls (7.1-7.3) in the working position on a bottom side of each pawl, the stop simultaneously bearing in a supporting manner an upper side of the rear part (10) of the pawls (7.1-7.3) to make the respective axis (8.1-8.3) of each pawl (7.1-7.3) substantially weight-free.

2. The stacking column according to claim 1, wherein each stop is a polygonal pin stop (13) or a round pin stop and each polygonal support is a polygonal pin support (12) or a round pin support.

3. The stacking column according to claim 1, wherein each polygonal pin support (12) and/or each polygonal pin stop (13) have a single contact surface for supporting each pawl (7.1-7.3) in the working position.

4. The stacking column according to claim 3, wherein each contact surface is smooth or ribbed.

5. The stacking column according to claim 2, wherein each polygonal pin stop (13) and/or each polygonal pin support (12) has a square profile or triangular profile.

6. The stacking column according to claim 2, wherein the polygonal pin stops (13) and the polygonal pin supports (12) are arranged in planes (E1, E2) relative to one another, wherein a distance (a) between two respective planes corresponds to a thickness (d) of each pawl (7.1-7.3).

7. The stacking column according to claim 1, wherein a buffer (11) is on the front of each supporting part (9).

8. The stacking column according to claim 1, wherein the pawls (7.1-7.3) are connected to one another via a linkage (17) which, when a first respective pawl is pivoted into the working position, brings a second respective pawl following the first respective pawl out of the resting position into a ready position.

9. The stacking column according to claim 1, wherein the rear part (10) of each pawl (7.1-7.3) is connected to one of the side walls (1.1, 1.2) via a force accumulator (14), which is configured to counteract a rotation of each pawl about its axis (8.1-8.3).

* * * * *